United States Patent
White et al.

(10) Patent No.: US 6,846,038 B1
(45) Date of Patent: Jan. 25, 2005

(54) INTEGRAL VEHICLE FRONT ASSEMBLY

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/611,367

(22) Filed: Jul. 1, 2003

Related U.S. Application Data

(63) Continuation-in-part of application No. 10/305,379, filed on Nov. 26, 2002, now Pat. No. 6,793,275.

(51) Int. Cl.$^7$ ................................................ B60N 2/44
(52) U.S. Cl. .............................. 296/193.11; 296/187.01; 296/203.02; 180/69.2
(58) Field of Search .......................... 296/181.1, 187.01, 296/187.09, 193.09, 193.1, 203.02, 193.11; 180/69.2, 69.21, 69.22

(56) References Cited

U.S. PATENT DOCUMENTS

| | | | | |
|---|---|---|---|---|
| 2,139,750 A | * | 12/1938 | Hicks .................... | 296/203.02 |
| 2,533,752 A | * | 12/1950 | Alamagny ............... | 180/21 |
| 2,569,218 A | * | 9/1951 | Bailey, Jr. .............. | 180/69.21 |
| 2,606,625 A | | 8/1952 | Paton .................... | 180/69 |
| D167,905 S | * | 10/1952 | Muller ................... | D12/92 |
| D169,541 S | * | 5/1953 | Handler .................. | D21/548 |
| 2,936,842 A | | 5/1960 | Fallin et al. ............ | 180/69 |
| 3,730,582 A | * | 5/1973 | Lieffring ............... | 296/203.02 |
| D251,725 S | | 5/1979 | Cesaro ................... | D12/164 |
| 4,359,119 A | * | 11/1982 | Kammerman .............. | 180/69.21 |
| 4,530,412 A | | 7/1985 | Sigety, Jr. ............. | 180/69 |
| 4,832,399 A | * | 5/1989 | Kosuge .................. | 296/203.02 |
| 5,115,878 A | * | 5/1992 | Hayata .................. | 180/69.21 |
| 5,605,371 A | | 2/1997 | Borchelt et al. ......... | 296/188 |
| 5,806,620 A | | 9/1998 | DeRees et al. | |
| 6,048,022 A | * | 4/2000 | Ishibashi et al. ........ | 296/187.09 |
| 6,196,621 B1 | * | 3/2001 | VanAssche et al. ....... | 296/187.09 |
| 6,422,643 B1 | * | 7/2002 | Pease ................... | 296/193.1 |
| 2003/0141746 A1 | * | 7/2003 | Stoffels et al. ......... | 296/203.02 |

OTHER PUBLICATIONS

"AstonMartins.com", Aston Martin Picture Gallery—Aston Martin DB/2/4 (1953–1955) pp. 2.

* cited by examiner

*Primary Examiner*—Patricia L. Engle
(74) *Attorney, Agent, or Firm*—Kathryn A. Marra

(57) ABSTRACT

A body panel includes a hood portion configured to extend over and across a vehicle front compartment, and two fender portions. A unitary, one-piece inner panel and a unitary, one-piece outer panel cooperate to define the hood portion and the two fender portions. The inner panel and the outer panel comprise a substantial portion of a vehicle body front end, replacing the multitude of inner panels, outer panels, and reinforcements in a prior art vehicle body. The body panel preferably functions as a load-bearing vehicle frame portion, reducing or eliminating prior art vehicle frame components. A method of manufacturing the body panel includes forming an inner panel and an outer panel using superplastic forming, quick plastic forming, or sheet hydroforming, and connecting the inner panel and the outer panel.

21 Claims, 7 Drawing Sheets

US 6,846,038 B1

INTEGRAL VEHICLE FRONT ASSEMBLY

CROSS-REFERENCE TO RELATED APPLICATION

This application is a continuation-in-part of U.S. application Ser. No. 10/305,379 filed on Nov. 26, 2002 now U.S. Pat. No. 6,793,275, entitled "Load-Bearing Body Panel Assembly for a Motor Vehicle", which is hereby incorporated by reference in its entirety.

TECHNICAL FIELD

This invention relates to vehicle body panels that have a hood portion and two fender portions at least partially defined by a unitary inner panel and a unitary outer panel.

BACKGROUND OF THE INVENTION

A typical prior art vehicle body includes a hood and two fenders. The hood and two fenders are mounted to various vehicle frame members such as upper rails, a cowl bar, and an upper tie bar.

SUMMARY OF THE INVENTION

A body panel for a vehicle is provided. The body panel has a hood portion and two fender portions. A unitary, i.e., one-piece, outer panel at least partially defines the hood portion and the two fender portions. A unitary, one-piece inner panel is operatively connected to the outer panel and further defines the hood portion and the two fender portions. The inner panel is preferably configured with sufficient strength such that the body panel does not require the use of reinforcement members.

The body panel is also preferably configured to be a load-bearing vehicle frame portion, reducing or replacing prior art frame members such as upper rails and upper tie bars. The body panel would thus replace a significant number of parts, components and subcomponents found in prior art vehicle bodies with a single integrated body panel comprising the unitary inner panel and the outer panel.

The elimination of frame members reduces the quantity of "hard" locations on a vehicle front end and correspondingly increases the quantity of deformable, energy-absorbing areas. The consolidation of fenders and hood into an integrated body panel eliminates the bard points formed at the seams between body panels in some prior art vehicles. The body panel also enables the placement of fastening elements such as hinges and/or latches near front hinge pillars instead of along a cowl and upper tie bar.

A method of manufacturing a body panel is also provided. The method includes forming an outer panel and an inner panel using a process selected from the group consisting of sheet hydroforming, superplastic forming, and quick plastic forming, and connecting the inner panel to the outer panel. The inner panel and the outer panel each partially define a hood portion and two fender portions of the body panel.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 4 is another schematic perspective view of the vehicle frame of

FIG. 3 in an attachment scenario with the body panel of FIG. 1;

DESCRIPTION OF THE PREFERRED EMBODIMENTS

Figure 1:
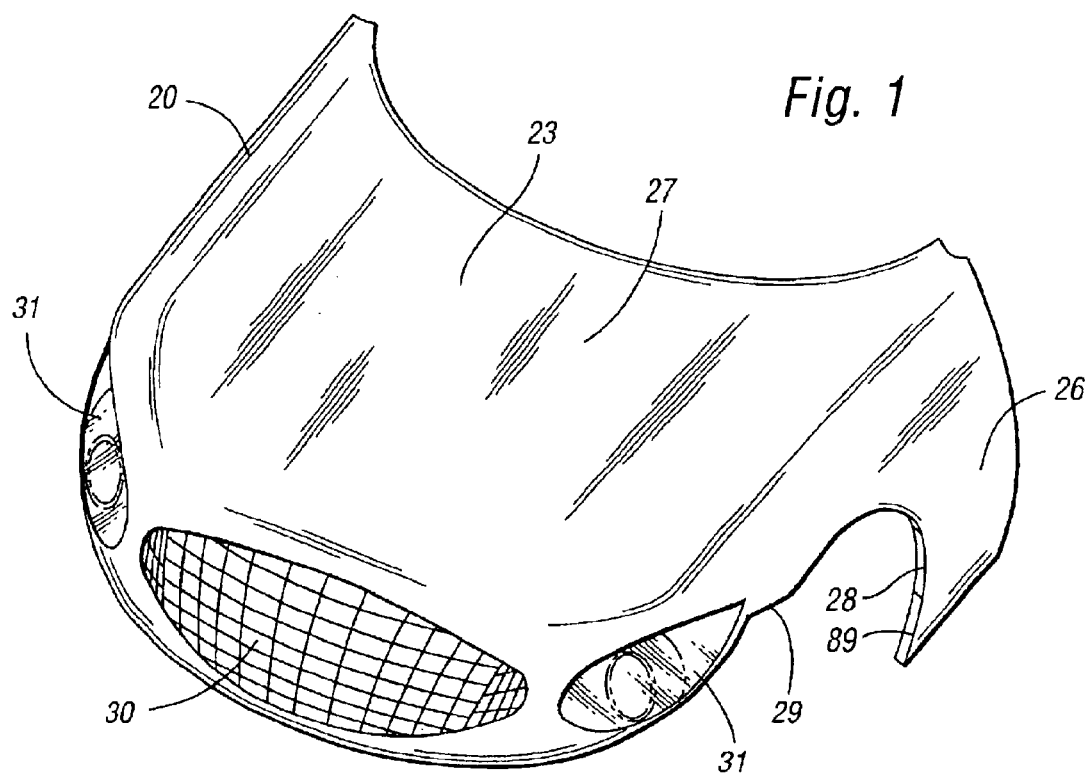
FIG. 1 is a schematic perspective view of a structural load-bearing body panel in accordance with the invention.

FIG. 1 is a schematic depiction of a body panel assembly 20 having a hood portion 23 configured to extend generally horizontally above and over a vehicle front compartment, and fender portions 26 extending generally vertically from opposite sides of the hood portion 23. The body panel assembly 20 is preferably configured to be a structural load-bearing vehicle frame portion which rigidly mounts to body frame members to transfer loads therebetween. However, within the scope of the claimed invention, the body panel assembly 20 need not be a structural load-bearing member.

An outer panel 27 partially defines the hood portion 23 and the fender portions 26. The outer panel 27 also defines part of the exterior surface of the body panel assembly 20 and partially defines the exterior surface of a vehicle. The outer panel 27 defines two wheel openings 28 along portions of the outer panel peripheral edge 29. The body panel assembly 20 is preferably a preassembled unit and includes a grill 30 and headlights 31.

Figure 2:
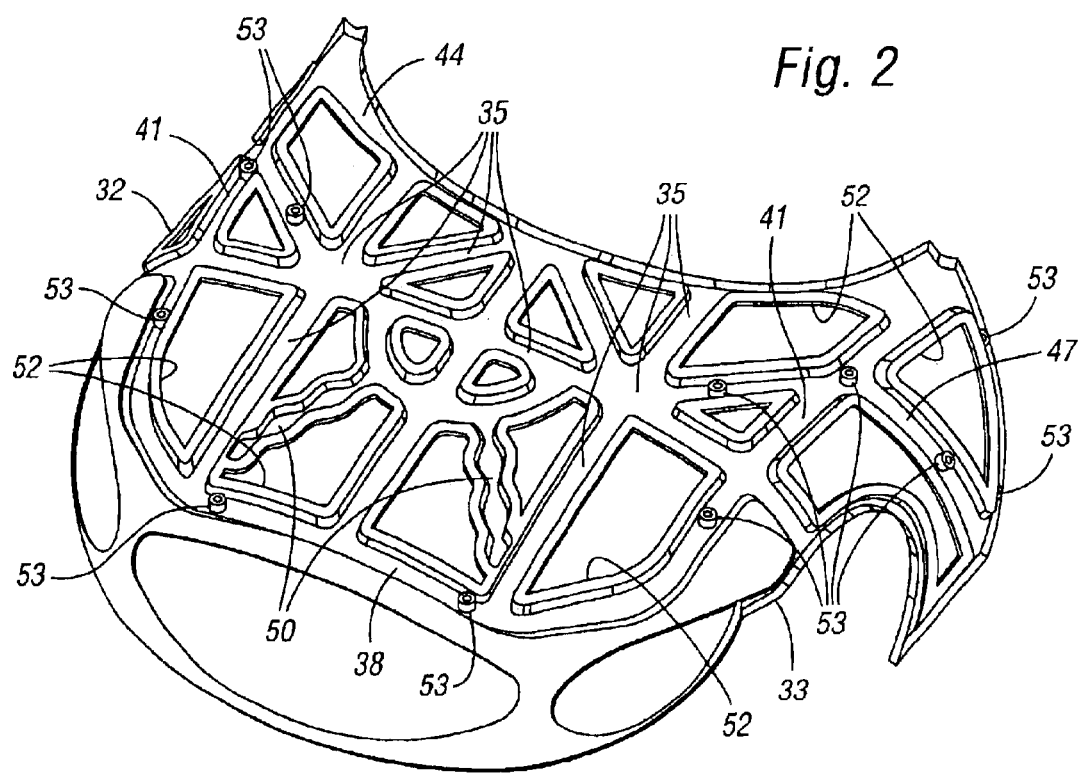
FIG. 2 is a schematic perspective view of an inner panel of the body panel of FIG. 1.

The outer panel 27 is fastened to an inner panel 32, depicted schematically in FIG. 2. The outer panel 27 and the inner panel 32 preferably substantially continuously abut one another at their respective peripheral edges 29, 33. In the context of the present invention, "continuously" means "at every point" or "in entirety." Thus, substantially every point of the inner panel peripheral edge 33 abuts the outer panel peripheral edge 29. In the context of the present invention, "abut" means to touch or to be closely adjacent without touching. Those skilled in the art will recognize a variety of fastening techniques that may be used to fasten the outer panel to the inner panel 32, such as adhesive bonding, laser welding, etc. In the preferred embodiment, hemming is employed to fasten the inner panel to the outer panel. The inner panel 32 further defines the hood portion and the fender portions.

The inner panel 32 serves as a structural member for the body panel assembly. The inner panel 32 is characterized by channel-shaped formations 35 configured to provide the inner panel 32 with structural integrity. Some of the formations are configured to bear or transfer loads that certain specific frame elements on a vehicle typically bear or transfer; these formations are configured to act as vehicle frame members that are an integral part of the body panel assembly. Integral frame member formations include an integral tie bar formation 38, integral upper rail formations 41, and an integral cowl bar formation 44. A formation 47 in each of the fender portions is configured to improve the structural rigidity of the fender portion and for bearing loads from front hinge pillars (not shown).

The integral frame member formations may be used in conjunction with a corresponding non-integral vehicle frame member to assist the non-integral frame member, or the integral frame member may entirely replace the corresponding non-integral frame member. For example, the integral upper rail formations 41 may be used with upper rails, facilitating the use of smaller, less prominent upper rails, or the integral upper rail formations may facilitate the elimination of upper rails in a vehicle body by performing the functions of upper rails. The formations 35, 38, 41, 44, 47 are preferably sufficiently configured such that the body panel assembly has suitable structural integrity and rigidity without separate reinforcement members connected to the inner panel or the outer panel. Formations 50 are configured to absorb energy in the event of a frontal impact.

The inner panel 32 preferably defines holes 52 between formations 35, 38, 41, 44, 47 where material has been removed to reduce the mass of the panel. Those skilled in the art will recognize a variety of processes that may be used within the scope of the claimed invention to form the holes, including laser cutting, punching, etc.

Clinch nuts 53 mounted to the inner panel 32 serve as attachment couplings configured to rigidly mount the body panel assembly 20 to load-bearing frame members on a vehicle. Those skilled in the art will recognize a variety of rigid and releasable fasteners and fastening systems that may be employed to enable the body panel assembly 20 to receive and transfer loads to and from the frame members to which it is attached.

The outer panel and the inner panel are each one piece. Those skilled in the art will recognize a variety of materials that may be employed within the scope of the claimed invention to form the inner panel and the outer panel, such as metals, plastics, composites, etc. Those skilled in the art will also recognize a variety of forming techniques that may be employed within the scope of the claimed invention to form the contours of the inner panel and the outer panel, such as stamping, injection molding, etc. However, the inner panel and the outer panel are preferably formed using sheet hydroforming, quick plastic forming, or superplastic forming so that their shapes are more complex than shapes that are generally achievable with stamping. Quick plastic forming is described in U.S. Pat. No. 6,253,588, issued Jul. 3, 2001 to Rashid, et al, which is hereby incorporated by reference in its entirety. Superplastic forming is described in U.S. Pat. No. 5,974,847, issued Nov. 2, 1999 to Saunders, et al, which is hereby incorporated by reference in its entirety.

Figure 3:
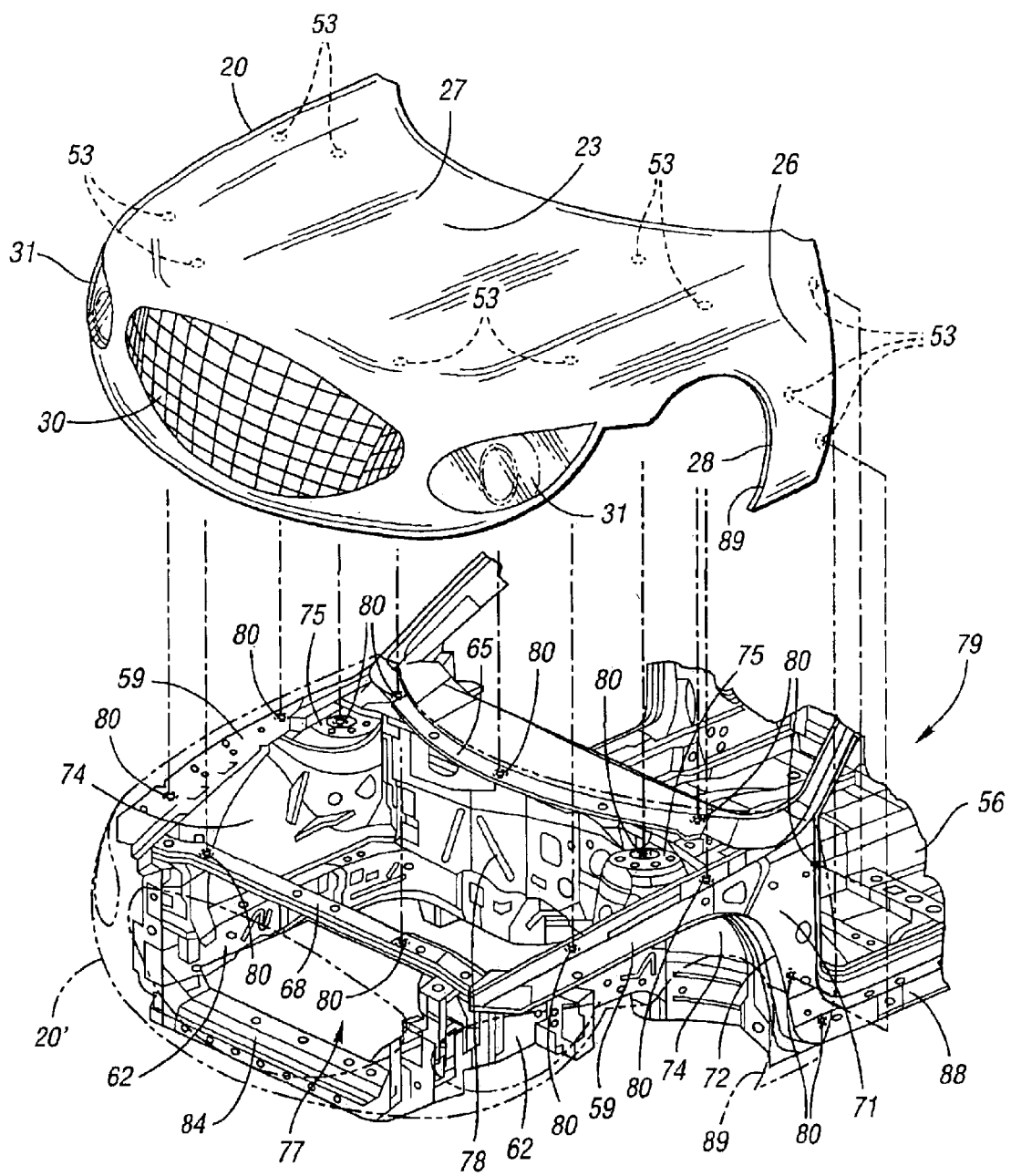
FIG. 3 is a schematic perspective view of a vehicle frame in an attachment scenario with the body panel of FIG. 1.

FIG. 3, wherein like reference numbers refer to like components from FIGS. 1 and 2, is a schematic perspective illustration of the front and partial left side of a vehicle frame 56 forming part of a vehicle. The vehicle frame 56 has a plurality of structural load-bearing body frame members, including upper rails 59; mid-rails 62; a cowl bar 65; an upper tie bar 68; front hinge pillars 71 each having a forward edge 72; and front wheelhouses 74 having shock towers 75. Some of the load-bearing body-frame members partially form a front compartment 77. A bulkhead 78 separates the front compartment 77 from a passenger space 79.

The upper rails 59 extend substantially longitudinally from the front hinge pillars 71 forward to the upper tie bar 68, and partially define the upper extent of the front compartment 77. The upper tie bar 68 is a cross member that extends substantially transversely and partially defines the upper and forward extent of the front compartment 77. The cowl bar 65 is a cross member that extends substantially transversely and partially defines the upper and rearward extent of the front compartment 77. Mid-rails 62, also referred to as "lower rails," extend substantially longitudinally at a lower height than the upper rails 59. The mid-rails 62 are inboard of the upper rails 59 to accommodate wheels. Front wheelhouses 74 extend from the mid-rails 62 to the upper rails 59. Shock towers 75 house various suspension components (not shown).

The front compartment 77 may be an "engine compartment" used to house various vehicular components, including steering system components, braking system components, and powerplant components. Within the scope of the claimed invention, the vehicle may employ any powerplant, such as a conventional internal combustion engine, an electric motor, a fuel cell, a hybrid-electric system, etc.

The upper rails 59, front hinge pillars 71, shock towers 75, and upper tie bar 68 each include complementary attachment couplings 80 engageable with, and positioned to align with, the attachment couplings 53 on the, inner panel. In the embodiment depicted, the complementary attachment couplings 80 are holes through which threaded bolts (not shown) are placed to engage the clinch nuts 53 on the body panel assembly 20. The attachment couplings 53, 80 are preferably releasably engageable so that the body panel assembly 20 is removable in the event that vehicular componentry in the front compartment 77 requires repair or replacement. The vehicle frame 56 depicted includes complementary attachment couplings 80 on the cowl bar 65 which may be used with a body panel assembly having corresponding clinch nuts. However, the body panel assembly 20 preferably, as depicted, does not include clinch nuts that align with complementary attachment couplings on the cowl bar. It may be preferable for the attachment couplings on the inner panel to be strikers and for the complementary attachment couplings to be latches to facilitate installation and removal of the body panel assembly 20.

The body panel is shown in phantom 200 rigidly mounted with respect to each of the upper rails 59, front hinge pillars 71, shock towers 75, and upper tie bar 68 such that the body panel assembly 20, and correspondingly the inner panel and the outer panel, substantially abut the cowl 65, a lower front cross member 84 that functions as a bumper, and rocker panels 88. The front cross member 84 that functions as a bumper is rigidly attached to the lower rails 62 in the embodiment depicted. However, those skilled in the art will recognize that, within the scope of the claimed invention, a "bumper" may be mounted to the frame 56 via energy-absorbers so that the bumper is movable relative to the frame 56 in an impact. A movable bumper may be preferable in order to satisfy regulations governing bumper performance.

The inner panel and the outer panel 27 of the body panel assembly 20 depend generally downwardly from the hood portion 23 to abut the bumper 84. The inner panel and the outer panel extend forward of the bumper 84 to thereby conceal the bumper 84 from view from the exterior of the vehicle. The forward edges 72 of the front hinge pillars 71 substantially continuously abut the inner panel and the outer panel of the body panel assembly 20. Each front wheel opening 28 of the vehicle is substantially entirely defined by the outer panel 27 of the body panel 20, including substantially the entire rearward edge 89 of each wheel opening 28.

In the context of the present invention, the body panel assembly 20 is "rigidly mounted" with respect to a frame member if a connection or fastening device fastening the body panel assembly 20 to the frame member is configured to bear and transfer loads and moments between the body panel assembly 20 and the frame member irrespective of load vector. For example, the body panel assembly 20 would not be rigidly mounted to a frame member if the only locking or fastening element interjacent the body panel and the frame member is a hinge; by design, a binge cannot support a moment, and the body panel assembly 20 could pivot relative to the frame member. Although the body panel assembly 20 is preferably rigidly mounted with respect to frame members, it is within the scope of the claimed invention to non-rigidly mount the body panel assembly with respect to frame members. For example, hinges may be employed in conjunction with at least one latch to pivotably connect the body panel assembly to the vehicle frame.

The loads borne by the frame members are smaller than those of conventional vehicles because the load-bearing body panel assembly 20 distributes loads among the frame members. As a result, the frame members need not be as large or prominent as they are in the prior art. For example, the upper rails 59, cowl bar 65, and upper tie bar 68 each have an open section form, as opposed to a closed box form found in the prior art.

Figure 4:
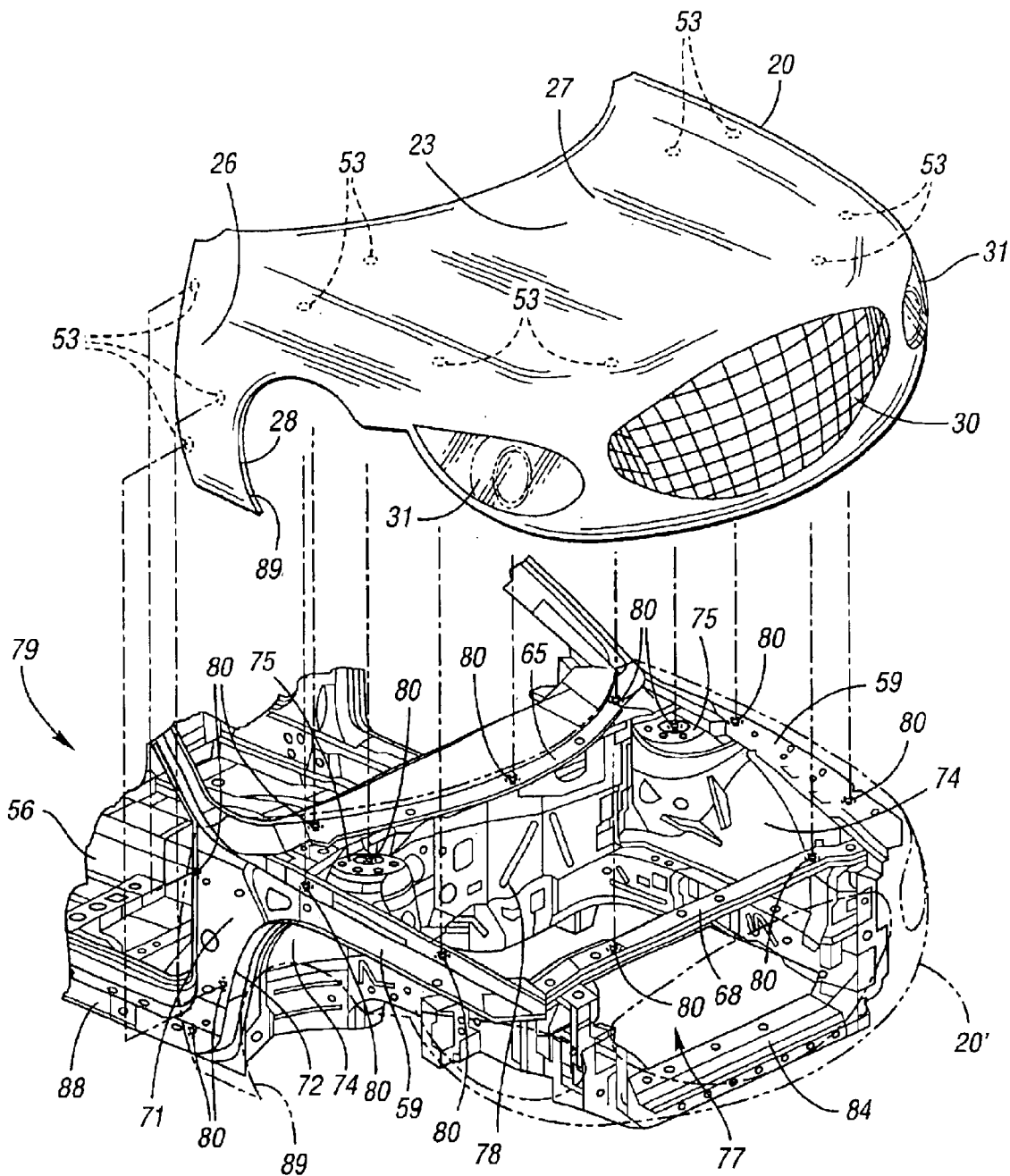

FIG. 4, wherein like reference numbers refer to like components from FIGS. 1–3, shows the front and partial right side of the vehicle frame 56 and body panel assembly 20.

Figure 5:
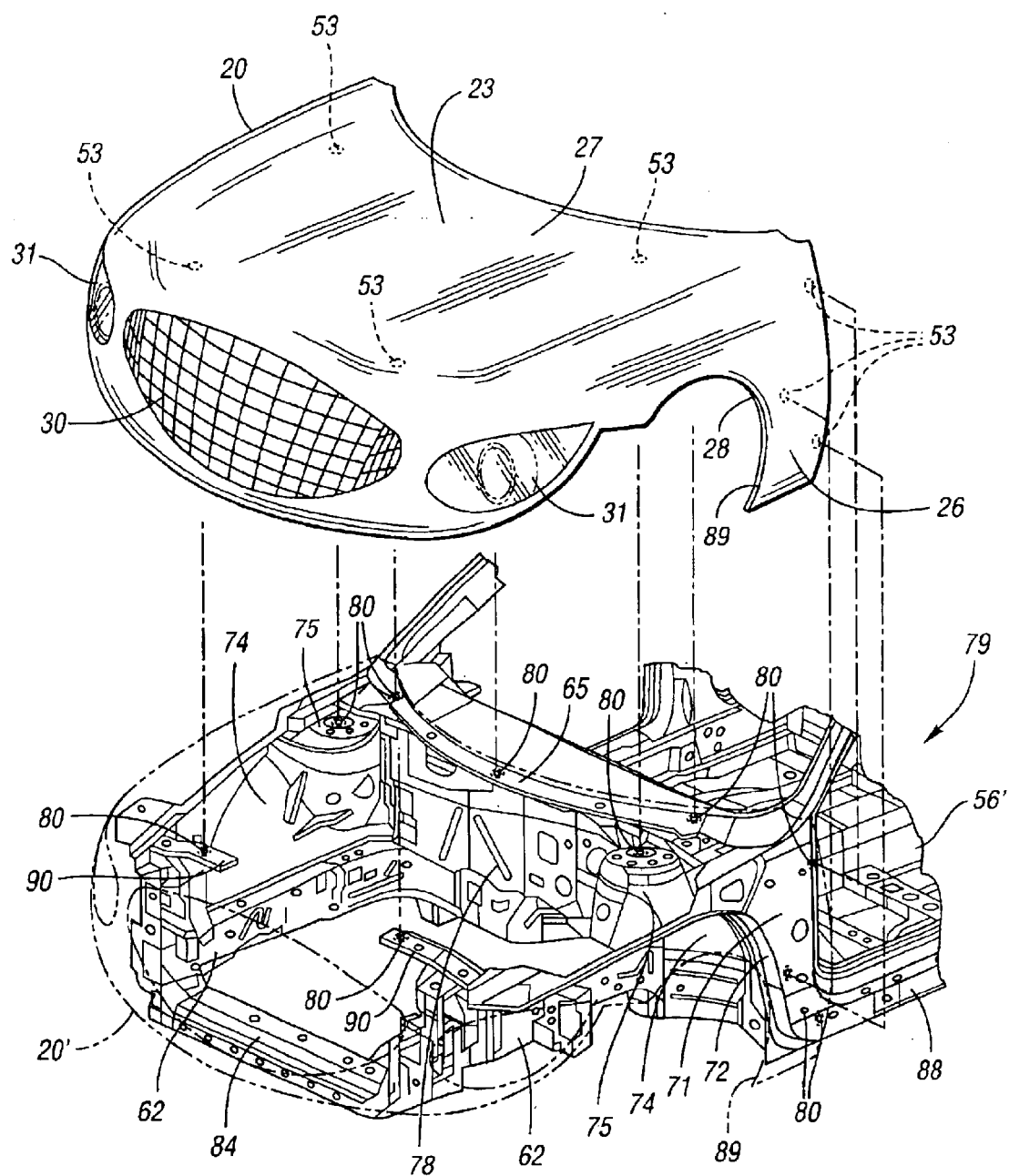
FIG. 5 is a schematic perspective view of an alternative vehicle frame structure in an attachment scenario with the body panel of FIG. 1.

Referring to FIG. 5, wherein like reference numbers refer to like components from FIGS. 1–4, a vehicle frame 56' with an alternative frame configuration is schematically depicted. The vehicle frame 56' does not have upper rails or an upper tie bar. The body panel assembly 20' is rigidly mounted to the front hinge pillars 71, shock towers 75, and upper front mounting brackets 90 (some of the clinch nuts 53 on the body panel assembly 20, 20' depicted in FIGS. 2–4 are not depicted in FIG. 5 for clarity). The body panel assembly 200 functions as a structural member, transferring loads between the front hinge pillars 71, the upper front mounting brackets 90, and the front wheelhouses 74, and replaces an upper tie bar and upper rails found in conventional vehicles.

Figure 6:
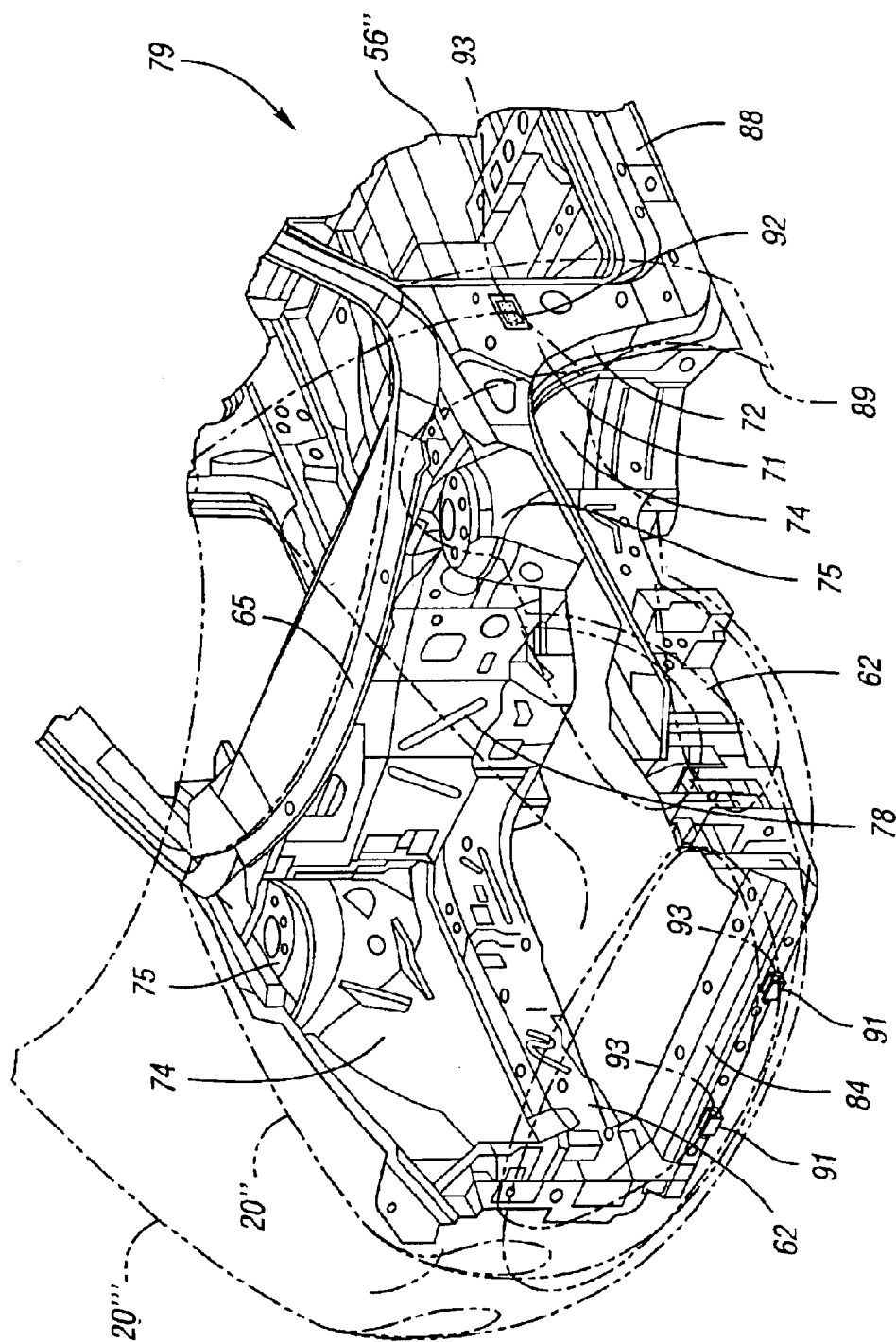
FIG. 6 is a schematic perspective view of an alternative body panel configuration pivotably mounted to yet another alternative vehicle frame structure.

FIG. 6, wherein like reference numbers refer to like components from FIGS. 1–5, is a schematic depiction of yet another vehicle frame 56" configuration and a body panel assembly 20". The vehicle frame 56" is characterized by the absence of an upper tie bar and upper rails. A latch 92 is mounted at each front hinge pillar 71. The body panel assembly 20" is substantially similar to the body panel assembly 20 of FIGS. 1–5, except that body panel assembly 20" does not include clinch nuts. Rather, body panel assembly 20" is mounted to the lower front cross member 84 with a pair of hinges 91 so that the body panel assembly 20" is pivotable about the hinges between a closed position and an open position (shown as 20'"). The body panel assembly includes a striker 93 attached thereto and positioned to engage latch 92 when the body panel assembly 20" is in the closed position. The body panel assembly 20" is operatively connected to the vehicle frame 56" without the use of any fastening or locking elements at any upper frame components. More specifically, the body panel assembly 20" is operatively connected to the vehicle frame 56" at points other than on a cowl bar, upper tie bar or other upper cross member, and upper rails. Rigid fasteners may similarly be employed at the lower front cross member 84 and front hinge pillars 71 to rigidly fasten the body panel assembly 20" to the vehicle frame 56".

Figure 7:
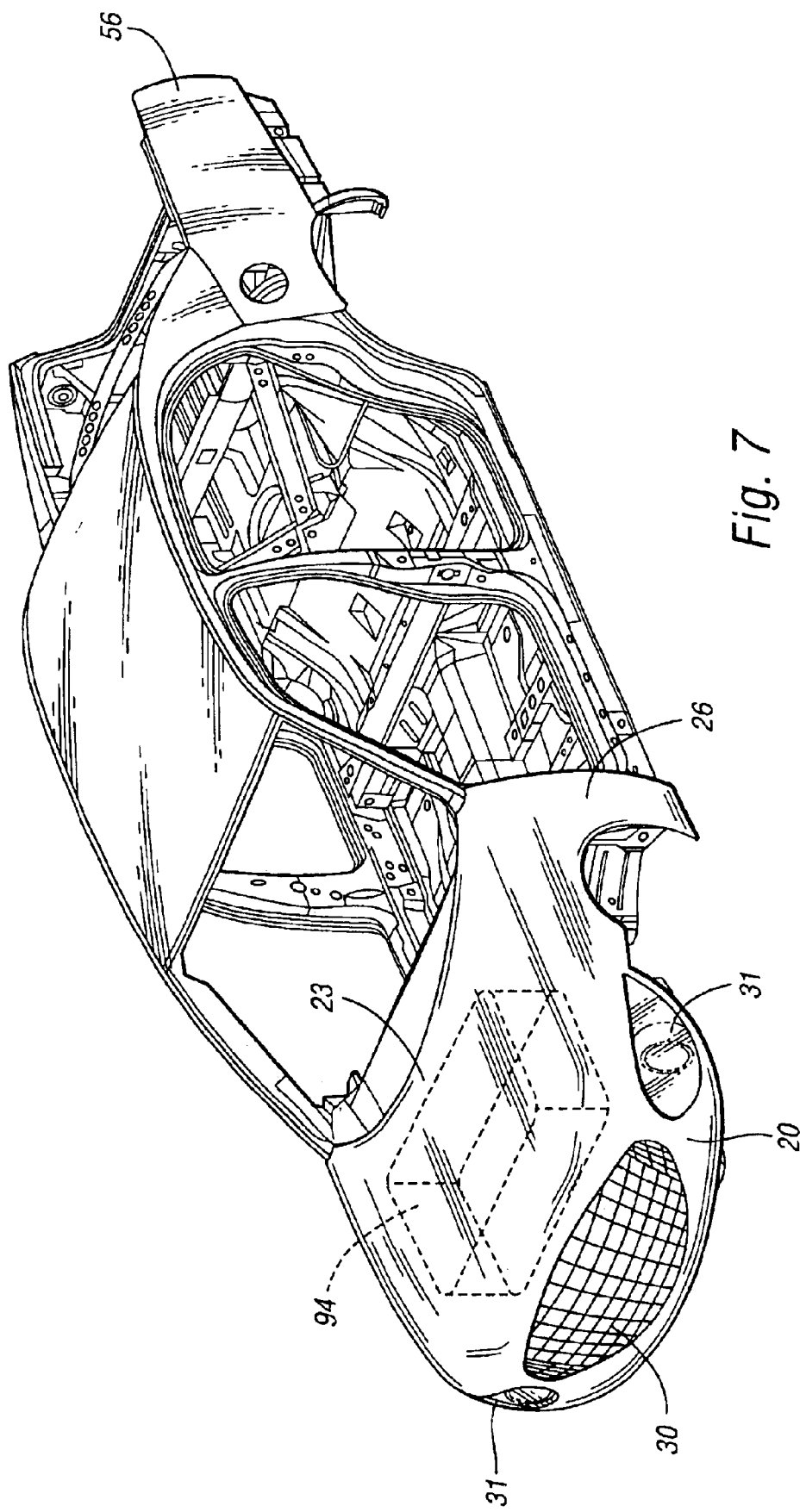
FIG. 7 is a schematic perspective view of the body panel of FIG. 1 rigidly mounted to a vehicle frame.

FIG. 7, wherein like reference numbers refer to like components from FIGS. 1–6, is a schematic depiction of the vehicle frame 56 with the body panel assembly 20 rigidly mounted to frame members. The hood portion 23 extends above and across the front compartment, thereby protecting vehicular components contained therein, including a powerplant 94. The powerplant 94 and other underhood vehicular components are preferably designed to perform for a significant amount of time without requiring repair or replacement. The powerplant 94 is preferably configured to operate without repair or replacement for the first one hundred thousand miles of vehicle travel.

The body panel assembly 20 does not exhibit overslam travel because it is rigidly mounted to the vehicle frame members. Since the body panel assembly 20 is rigidly mounted to frame members, access to battery terminals for battery recharging or jump-starts, oil fill, windshield solvent fill, and powerplant coolant fill is preferably provided in a location that does not require the removal of the body panel assembly 20. For example, access may be provided in a trunk area, or behind a removable or retractable panel in the front of the vehicle.

Figure 8:
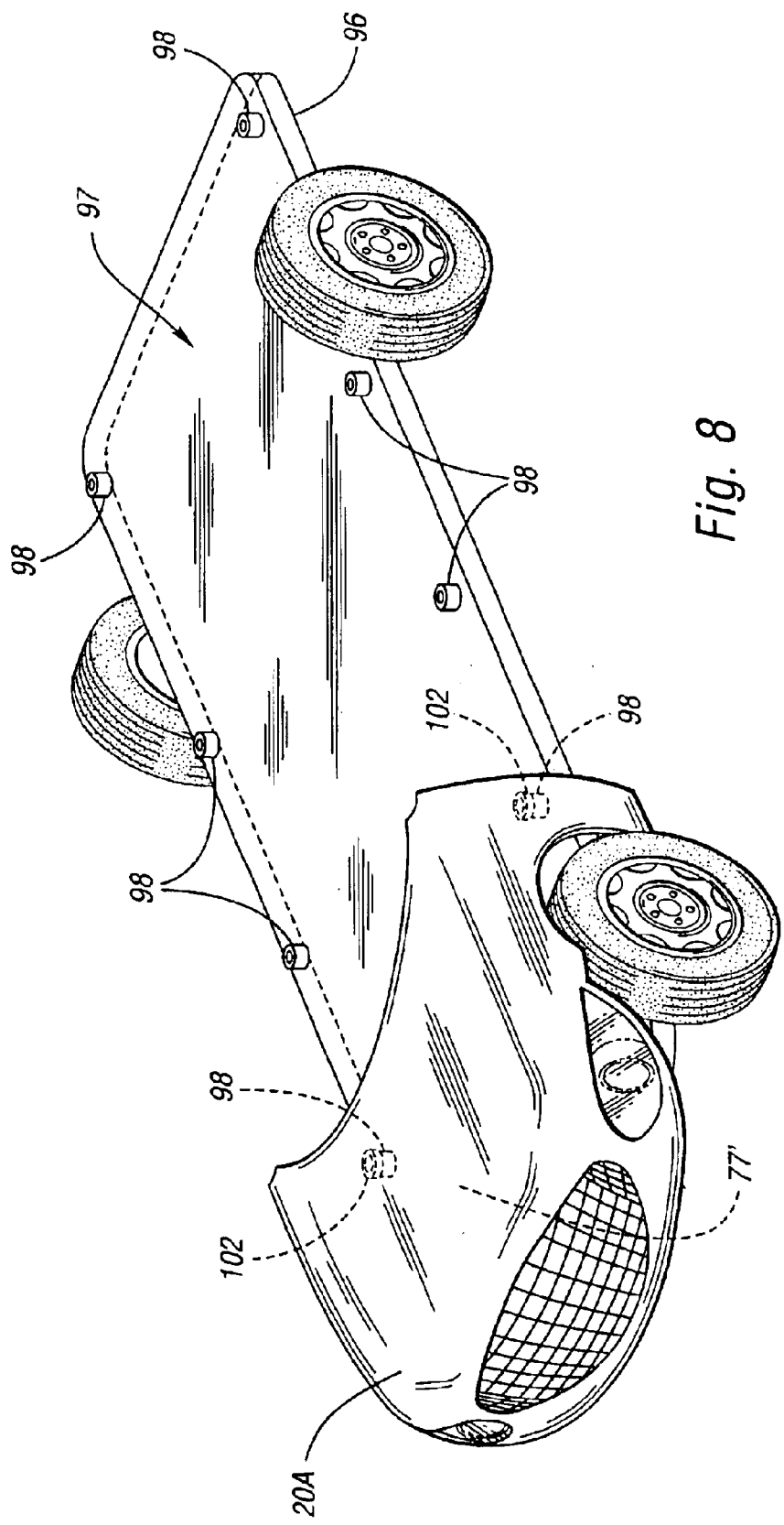
FIG. 8 is a schematic perspective view of an alternative body panel configuration mounted to a substantially flat chassis.

Referring to FIG. 8, wherein like reference numbers refer to like components from FIGS. 1–7, an alternative embodiment of the body panel assembly 20A is mounted with respect to a chassis 96. Body panel assembly 20A is substantially similar to the body panel assembly 20 depicted in FIG. 1, but has different attachment couplings. The chassis 96 is self-contained and has substantially all of the mechanical, electrical, and structural componentry necessary for a fully functional vehicle, including at least an energy conversion system, a suspension and wheels, a steering system, and a braking system. The chassis has a simplified, and preferably standardized, interface with connection components to which bodies of substantially varying design can be attached. X-by-wire technology is preferably utilized to eliminate mechanical control linkages. The chassis 96 is described in U.S. patent application Ser. No. 10/205,007, and U.S. patent application Ser. No. 10/202,998, both of which are hereby incorporated by reference in their entireties.

The chassis 96 has a substantially horizontal upper chassis face 97 achieved by distributing chassis systems throughout a chassis structural frame (not shown). Load-bearing body-retention couplings 98 are engageable with complementary attachment couplings 102 on a vehicle body or vehicle body part, such as body panel assembly 20A, and function to physically fasten the vehicle body part 20A to the chassis 96. In the embodiment depicted, the load-bearing body-retention couplings 98 are support brackets with bolt holes, and the complementary attachment couplings 102 are brackets with bolt holes. A bolt and nut (not shown) are used to join a load-bearing body-retention coupling 98 and a complementary attachment coupling 102.

The front compartment 77' is primarily defined by the body panel assembly 20A, and may be a portion of an occupiable passenger space if a bulkhead is not employed to close out the front compartment 77'.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

What is claimed is:

1. A body panel for a vehicle, the body panel comprising:
a unitary outer panel, the outer panel at least partially defining a hood portion and two fender portions of the body panel; said hood portion being configured to extend over and across a front compartment of the vehicle, and said two fender portions of the body panel extending from opposite sides of the hood portion; and
an inner panel operatively connected to the outer panel and further defining the hood portion and the two fender portions.

2. The body panel of claim 1, wherein the vehicle includes two front hinge pillars each having a forward edge, and wherein the inner panel and the outer panel are configured such that the forward edge of each of the two front hinge pillars substantially continuously abuts the inner panel and the outer panel when the body panel is operatively connected to the vehicle.

3. The body panel of claim 1, wherein the outer panel at least partially defines two wheel openings, and wherein the inner panel abuts the two wheel openings.

4. The body panel of claim 1, wherein the inner panel includes strengthening formations configured to provide the body panel with structural rigidity.

5. The body panel of claim 1, wherein the inner panel includes formations configured to absorb energy in the event of a vehicle impact.

6. The body panel of claim 1, wherein the inner panel or the outer panel is formed using a process selected from the group consisting of superplastic forming, quick plastic forming, and sheet hydroforming.

7. A vehicle comprising:
a body panel having a hood portion extending over and across a front vehicle compartment, and two generally vertically-oriented fender portions extending from opposite sides of the hood portion; the body panel including a unitary outer panel at least partially defining the hood portion, the two fender portions, and the exterior surface of the vehicle, and a inner panel operatively connected to the outer panel and further defining the hood portion and the two fender portions.

8. The vehicle of claim 7, further comprising:
two front hinge pillars each having a forward edge, and wherein the forward edge of each of the two front hinge pillars substantially continuously abuts the body panel.

9. The vehicle of claim 7, wherein the outer panel at least partially defines two wheel openings, and wherein the inner panel abuts at least a portion of the two wheel openings.

10. The vehicle of claim 7, further comprising a front bumper, and wherein the outer panel abuts the front bumper.

11. The vehicle of claim 7, further comprising a front bumper, and wherein the outer panel depends downwardly from the hood portion to extend forward of the front bumper and thereby conceal the front bumper from view.

12. The vehicle of claim 7, further comprising two rocker panels, and wherein the outer panel substantially abuts the two rocker panels.

13. The vehicle of claim 7, further comprising a front bumper and a cowl, and wherein the outer panel substantially abuts the cowl and extends above, or substantially abuts, the front bumper.

14. The vehicle of claim 7, wherein the inner panel includes two integral upper rail formations, and wherein the vehicle is characterized by the absence of upper rails.

15. The vehicle of claim 7, wherein the inner panel is characterized by strengthening formations configured to provide structural rigidity.

16. The vehicle of claims 7, wherein the inner panel or the outer panel is formed using one of superplastic forming, quick plastic forming, and sheet hydroforming.

17. The vehicle of claim 7, further comprising a lower front cross member and two front hinge pillars, and wherein the body panel is connected to the lower front cross member and the two front hinge pillars.

18. The vehicle of claim 17, wherein the vehicle is characterized by the absence of an upper tie bar and upper rails.

19. The vehicle of claim 17, wherein the vehicle further comprises a cowl bar, and wherein the body panel is not connected to the cowl bar.

20. The vehicle of claim 7, further comprising a front hinge pillar, a front cross member, a hinge pivotably connecting the body panel with respect to the front cross member; a striker operatively connected to the body panel; and a latch operatively connected to the front hinge pillar; wherein the body panel is movable between an open position and a closed position; and wherein the latch is configured to releasably engage the striker to retain the body panel in the closed position.

21. A vehicle comprising:
a body panel having a hood portion extending over and across a front vehicle compartment and two generally vertically-oriented fender portions extending from opposite sides of the hood portion; the body panel having a unitary outer panel at least partially defining the exterior surface of the vehicle, the hood portion, and the two fender portions, and a unitary inner panel operatively connected to the outer panel and further defining the hood portion and the two fender portions;
a lower front cross member and two front hinge pillars, the body panel being mounted to the lower front cross member and the two front hinge pillars;
wherein the vehicle is characterized by the absence of an upper tie bar and upper rails.

* * * * *